Aug. 12, 1947.                K. R. LARSON                2,425,477
                                BRACELET
                           Filed July 30, 1945
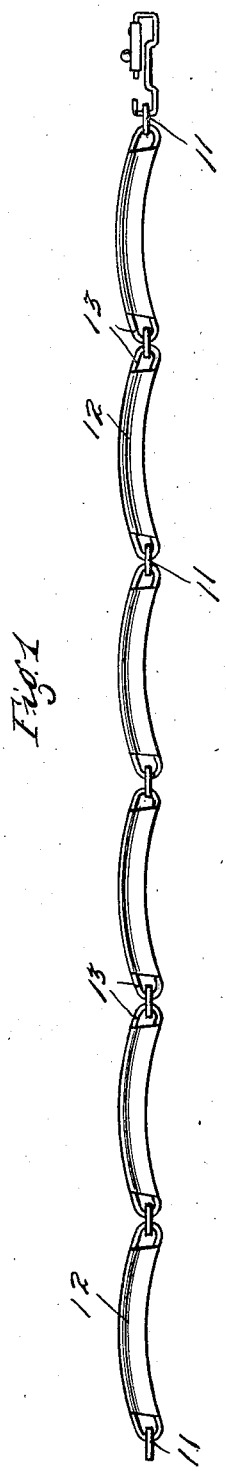
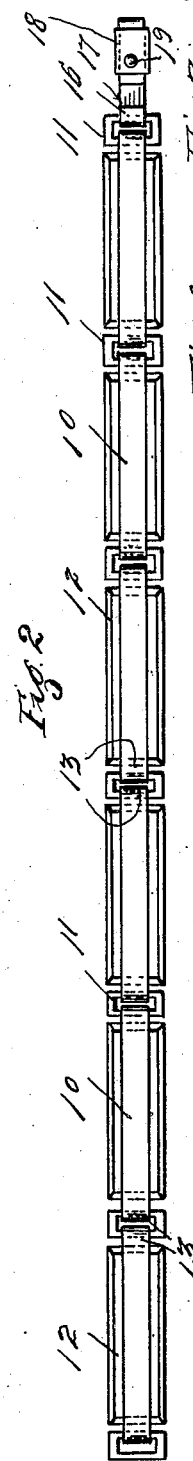
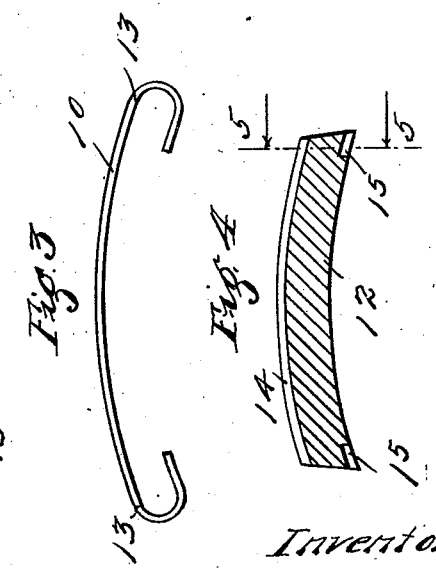
Inventor
Karl R. Larson
By his Attorney
Harry D. Kilgore Patented Aug. 12, 1947

2,425,477

UNITED STATES PATENT OFFICE 2,425,477

BRACELET

Karl R. Larson, Minneapolis, Minn., assignor to The Paul Bunyan Bait Company, Minneapolis, Minn., a corporation of Minnesota Application July 30, 1945, Serial No. 607,826

6 Claims. (Cl. 63—3)

My present invention relates to jewelry and, more particularly, to a bracelet of the linkage type.

The principal object of this invention is to provide separably interlocked assembly and connecting links, the latter releasably holding an ornament and said ornament preventing separation of the interlocked links.

Another object of this invention is to provide a novel catch for releasably connecting the ends of a linkage.

These and other objects of the invention will be apparent from the following description, reference being had to the drawing.

To the above end, the invention consists of the construction and arrangement hereinafter described and defined in the claims.

In the accompanying drawing, which illustrates the invention, like characters indicate like parts throughout the several views.

Referring to the drawing:

Fig. 1 is a side elevation of the improved bracelet;

Fig. 2 is a top view of the same;

Fig. 3 is a side view of one of the assembly links, on an enlarged scale;

Fig. 4 is a view of one of the ornaments in longitudinal central section, on an enlarged scale;

Fig. 5 is a view in transverse section taken on the line 5—5 of Fig. 4;

Fig. 6 is a side view of the catch, on an enlarged scale;

Fig. 7 is a transverse section taken on the line 7—7 of Fig. 6;

Fig. 8 is a view corresponding to Fig. 6, but showing the link closed and a portion thereof broken away and sectioned; and Fig. 9 is a modification of the assembly link and ornament.

The improved bracelet comprises a plurality of alternate assembly and connecting metal links 10 and 11, respectively, and ornaments 12, in the form of a plastic stone or other object.

Each assembly link 10, as shown in Figs. 1, 2 and 3 is a relatively wide, thin strip of metal. The end portions of the assembly link 10 are bent downwardly and inwardly parallel to said link to form hook-like coupling members 13. The assembly link 10, longitudinally, is on the arc of a relatively large circle.

The ornament 12 is relatively thick and, longitudinally, has the same curvature as the assembly link. The assembly link 10 is inlaid in the ornament 12 by forming in said ornament a channel 14 that extends longitudinally the full length of the ornament 12. Both tops of the assembly link 10 and the ornament 12 are flush and the coupling members 13 extend outwardly of the ends of the ornament 12 with their ends underlapping the under side of the ornament 12.

Seats 15 in the under side of the ornament 12 are provided for the underlapped end portions of the coupling members 13. The distance between the upper and lower sections of the coupling members 13 is slightly less than the distance between the bottoms of the channel 14 and seats 15 so that the ornament is firmly held by the assembly link 10 and the coupling members 13.

Adjacent assembly links 10 are separably connected by one of the connecting links 11, which is rectangular in form, by interlocking their coupling members 13 therewith.

To assemble the three units of each section of the bracelet, it is only necessary to insert the coupling members 13 through the connecting links 11, spring said end members away from the assembly link 10 sufficiently to permit the ornament 12 to be moved sidewise between the assembly link 10 and the coupling members 13 until said assembly link enters the channel 14 and finally releases said coupling members and permits the same to spring into the seats 15.

It will thus be seen that a bracelet of any desired length may be quickly and easily assembled from the several duplicate elements without the use of a tool. Obviously, the assembly links 10 releasably hold the ornaments 12 and said ornaments, in turn, keep the connecting links 11 and the coupling members 13 interlocked so that they will not be accidentally separated.

The ornaments are preferably, but not necessarily, colored plastic. It is, of course, an extremely easy matter to remove the ornament 12 of one color and substitute therefor ornaments of a different color.

The two end connecting links 11 are separably connected by a novel catch 16. This catch 16 is formed by a strip of metal similar to the assembly link 10 as to width and thickness. Said catch 16 is rectangular in form and has in its top member an intermediate entrance passageway 17 normally closed by a slide 18. This slide 18 has a fingerpiece 19 and is frictionally held in an operative position by a hump on the catch 16 and a depression in the slide 18, as indicated at 20.

The bottom member of the catch 16 is inwardly offset at 21 and closely positioned to the slide 18. This offset 21 prevents either of the connecting links 11 from movement between said offset and the slide 18 and always keeps the catch 16 interlocked with one of the connecting links 11 so that they cannot become separated. Said offset 21 also prevents the respective connecting links 11 from moving past each other or in getting mixed up.

The modification shown in Fig. 9 simply shows an assembly link of a different design and said link, the attached ornament and the coupling members are designated by the numerals 22, 23 and 24, respectively.

The drawing illustrates a commercial form of the invention, but it will be understood that the same is capable of certain modifications as to details of construction and arrangement within the scope of the invention herein disclosed.

What I claim is:

1. A bracelet comprising alternate assembly and connecting links, the end portions of the assembly links being folded thereunder to afford coupling members separably interlocked with the connecting members, and ornaments releasably held by the assembly links and the coupling members, said ornaments preventing separation of the coupling members and the connecting links, said assembly links being inlaid in the ornament and thereby holding said ornaments against sidewise movement relative to the assembly links.

2. A bracelet comprising alternate assembly and connecting links, the end portions of the assembly links being folded thereunder to afford coupling members separably interlocked with the connecting members, and ornaments releasably held by the assembly links and the coupling members, said ornaments having seats for the end portions of the coupling members, and preventing separation of the coupling members and the connecting links.

3. A bracelet comprising alternate assembly and connecting links, the end portions of the assembly links being folded thereunder to afford coupling members separably interlocked with the connecting members, and ornaments, releasably held by the assembly links and the coupling members, said assembly links being inlaid in the top of the ornaments, said ornaments having seats in their under sides in which the end portions of the coupling members are yieldingly held and preventing separation of the coupling members and the connecting links.

4. A bracelet comprising alternate assembly and connecting links, the end portions of the assembly links being folded thereunder to afford coupling members separably interlocked with the connecting members, and ornaments releasably held by the assembly links and the coupling members, said assembly links being inlaid in the ornaments, said ornaments having seats in which the coupling members are releasably held, the end portions of the ornaments closing the openings between the assembly links and the end portions of the coupling members.

5. A bracelet comprising alternate assembly and connecting links, the end portions of the assembly links being folded thereunder to afford coupling members, and ornaments extending between the assembly links and their coupling members and removably held thereby, and affording closures that prevent removal of the connecting links from the coupling members.

6. A bracelet comprising alternate assembly and connecting links, the end portions of the assembly links being folded thereunder to afford coupling members, and ornaments separably interlocked with the assembly links with their end portions extending between the assembly links and the coupling members and affording closures that prevent removal of the connecting links from the coupling members.

KARL R. LARSON.

REFERENCES CITED

The following references are of record in the file of this patent:

UNITED STATES PATENTS

| Number | Name | Date |
|---|---|---|
| 1,428,678 | Buchsbaum | Sept. 12, 1922 |
| 1,441,556 | Bössner | Jan. 9, 1923 |